Nov. 6, 1923. Re. 15,718

G. B. WADSWORTH

SAFETY BOX FOR ELECTRIC INSTALLATION

Original Filed Aug. 11, 1916

INVENTOR:
Guy B. Wadsworth
BY
ATTORNEYS.

Reissued Nov. 6, 1923. Re. 15,718

UNITED STATES PATENT OFFICE.

GEORGE B. WADSWORTH, OF COVINGTON, KENTUCKY, ASSIGNOR, BY DIRECT AND MESNE ASSIGNMENTS, TO THE WADSWORTH ELECTRIC MANUFACTURING COMPANY, OF COVINGTON, KENTUCKY, A CORPORATION OF KENTUCKY.

SAFETY BOX FOR ELECTRIC INSTALLATION.

Original No. 1,403,659, dated January 17, 1922, Serial No. 114,325, filed August 11, 1916. Application for reissue filed September 26, 1923. Serial No. 665,029.

*To all whom it may concern:*

Be it known that I, GEORGE B. WADSWORTH, a citizen of the United States, and a resident of the city of Covington, in the county of Kenton and State of Kentucky, have invented certain new and useful Improvements in Safety Boxes for Electric Installation, of which the following is a full, clear, and exact description, reference being had to the accompanying drawing, forming part of this specification.

My invention relates to switch boxes into which are led the outside mains of source of supply of electricity, in connection with which fuses are provided adapted to burn out if too heavy a current is accidentally sent through the mains.

The object of my invention is to provide a safety box for fuses and cut-out switches, whereby access to the fuses is prevented until the switch is opened to cut off the current from the fuse connections. It is also the object to provide in such a box for means for exposing the fuse connection for replacement of the fuse without access to the switch or other terminals, whereby it shall be impossible without permanently injuring or destroying the box to insert electrical connections to pass the current around the electric meter and thus to use current without any registration on the meter. Thus it is my object to prevent "stealing" of current by the consumer of electricity while at the same time giving him full access to the fuses for changing or removing them. I also desire to provide for means for locking the switch in such boxes in open position to prevent all use of current.

Safety boxes in which the cut-out switch is arranged to prevent access to the fuse without opening the switch have been devised, but in such devices there has heretofore been no provision made to allow for access to the fuses without also exposing the terminals of the switch. The result of use of such boxes is that whenever it is desired to change the fuses, the box must be opened from headquarters, which is a great annoyance.

It is an exception to the rule that fuses must be set into the service lines or mains before the local switch, where the switch is encased in a closed compartment independent of the fuses. This is because there is no chance of any object falling across the terminals of the switch and causing a burning. Thus it is my object to set the switch into the service line ahead of the fuses and enclose the switch in a separated casing, thereby allowing the fuses, when they are accessible, to be disconnected from the service line, by the opening of the switch.

These various objects I accomplish by that certain construction and arrangement of parts to be hereinafter more specifically pointed out and claimed.

Figure 1:
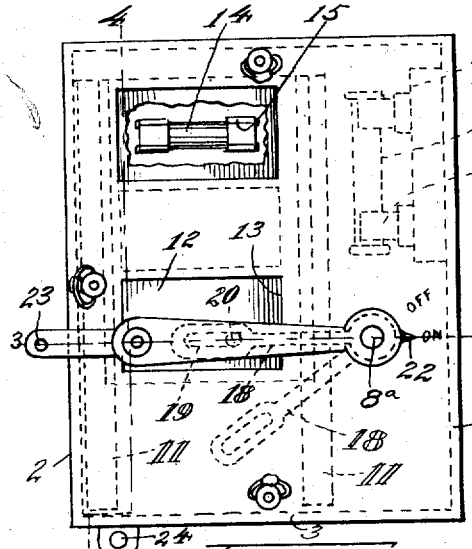
Figure 1 is a front elevation of the safety box, broken away so as to reveal one of the fuses.
Figure 3:
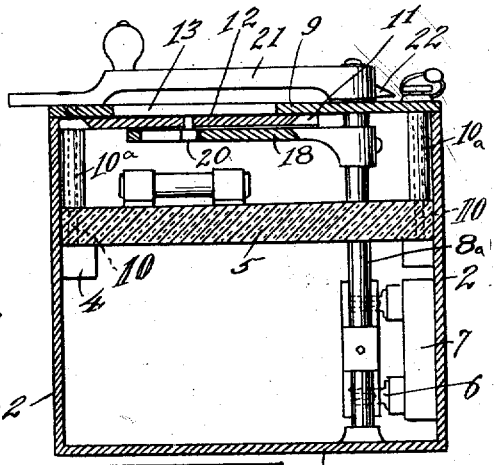
Figure 3 is a cross section of the box taken on the line 3—3, of Figure 1.
Figure 2:
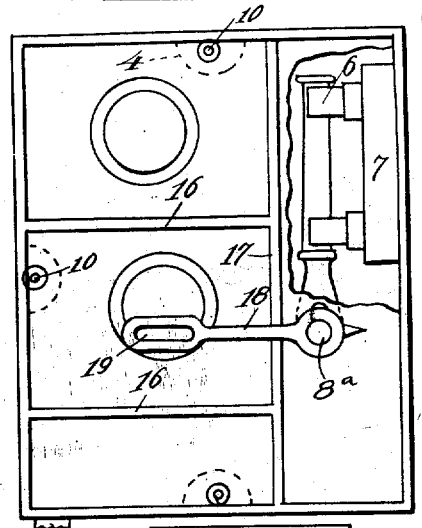
Figure 2 is a like view of the box with the lid removed.
Figure 4:
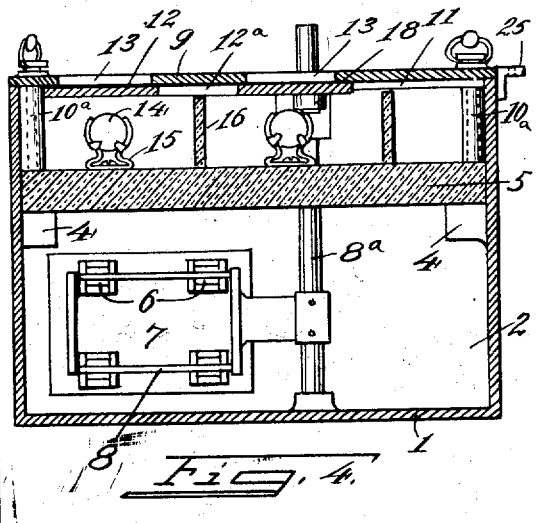
Figure 4 is a longitudinal section thereof, taken on the line 4, 4, of Figure 1.
Figure 5:
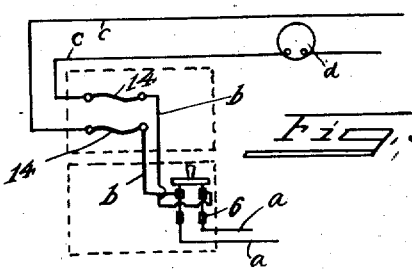
Figure 5 is a diagrammatic view of the wiring of the device.

The box, which will be considered as mounted on a wall, has the back 1, the sides 2, 2, and the base 3. The box is of stout metal, and is provided with lugs 4, 4, on which is seated the plate 5 of insulating material, forming with the back of the box a tight and complete compartment for the switch 6. The switch is mounted on the one side of the box on a suitable base 7, and has the switch closer or knife 8, which is secured tightly to a revoluble post $8^a$ that extends out through the compartment and outside of the box.

The box has a lid 9 likewise of metal, and extending up from the lugs 4, 4, are screws 10, 10, which pass through the compartment forming plate 5. On these screws are set sleeves or other spacer members $10^a$, and the screws extend up through the lid of the box. The lid is sealed down in any acceptable manner, and holds down the compartment plate by means of the spacer sleeves.

Strips 11, 11, are mounted on the under side of the lid, and are beveled to form a dovetailed guideway for a shutter. This shutter 12 has two openings 12a in it, which are adapted to register with openings 13, 13, in the lid. Thus when the shutter is in one position, the openings in the lid will be closed, and said openings will be opened by sliding the shutter to another position.

The device shown is for a two-wire service, but, of course, the modification of the device to accommodate three, or four wires, or more, would not involve a departure from the invention therein.

Mounted on the compartment plate 5, one beneath each opening in the lid, are the fuses 14, 14, mounted in clips 15. Each fuse has a compartment formed around it by means of cross walls 16 and 17, whereby should a fuse be lifted out of its socket, and dropped by accident, it will not roll to an inaccessible position. The lid, it will be remembered, is to be sealed in place, and fuses might be lost in the above manner.

The revoluble post which carries the switch knife or closer, has mounted fixedly on it, in the space above the switch compartment and beneath the lid of the box, an arm 18 which has a slotted end 19. On the base of the sliding shutter is a roller or knob 20 which engages in the slot of the end 19, so that when the post is revolved to close or open the switch, the shutter is moved at the same time.

On the outside of the box, there is mounted on the post a handle 21 by which the post is revolved, and this handle has an indicator arrow 22 thereon. The words "Off" and "On" are printed on the lid, to indicate to the operator that when the handle is in one position the switch is open, and in another that it is closed.

When the switch is open, the parts are arranged so that the shutter is open. However, the access to the fuses through the lid openings does not expose the switch points in any way, so that current can be stolen. Not only this, but the wiring is such that the fuses are dead when the switch is open.

As shown in the diagram, the service wires *a*, *a*, pass first to the switch, thence they pass to the fuses at *b*, *b*, and from the fuses the current passes by the wires *c*, *c* to the meter *d*. The object being to prevent the shunting of current around the meter, it is evident that with proper conduits from the service wires to the box, and from the fuses in the box to the meter, there will be no opportunity for the fraudulent user to shunt out the meter.

In the above safety box there is easy accessibility to the fuses, however, and the only possible way of stealing current, i. e., shunting out the meter, would be to break the box, or get wires from the fuses out through the shutter. To prevent the latter way of stealing, the closed spaces of the shutter must be so proportioned that they will close up the fuse openings in the lid before the switch points make even a partial contact. Not only this, but the shutter must be mounted so close to the lid that it will not shut and permit the switch to close over any wire which would be practical for use with usual service currents.

For locking the switch open, thereby preventing use of current, the handle 21 is provided with a slot or eye 23, which registers with the slot 24 in a lug 25 on the box, when the switch is open. Thus a padlock may be used to lock open the switch, which same padlock or other locking means may be sealed in the usual manner.

It seems clear that any electric installation, such as to a motor, a heater or the like, would be an advantageous use for my invention, as use with a meter to prevent stealing current is but one use. As a safety device for cutting off current from fuses to prevent the accidental shock to an operator in removing fuses for replacement it is very valuable.

I do not wish to be limited in my claims that follow to any specific means of assembling the various elements of my new safety box, because of a failure to mention equivalent structures in the above specification. On the contrary, I wish it understood that the above drawing and specification are descriptive of merely the preferred embodiment of my invention.

Having thus described my invention, what I claim as new and desire to secure by Letters Patent, is:—

1. In a switch box, two separated compartments, a switch in one, a fuse in the other, a lid for the box, a hole in the lid giving access to the fuse chamber, an externally operated shaft in the box having means thereon for operating the switch, a shutter moving in the same plane as the lid and on the under side thereof to control the blocking and unblocking of said hole, and means on the shutter cooperating with the shaft as distinguished from the switch, whereby the shaft will enforce closure of it when the switch is closed.

2. In a switch box, mutually inaccessible switch and fuse compartments, a switch and a fuse in its respective compartment, a rotatable operating member for the switch, said box having an opening for access to the fuse compartment, a shutter moving in the plane of the box about said hole, located on the inside of the box and adapted to block and unblock said hole, said shutter being free of direct connection to the switch, and means on the operating member and the shutter to enforce a closed position of the shutter in all closed positions of the switch.

3. In a switch box, mutually inaccessible switch and fuse compartments, a switch and a fuse in its respective compartment, a rotatable operating member for the switch, said box having an opening for access to the fuse compartment, a shutter moving in the plane of the box about said hole and closely adjacent thereto and adapted to block and unblock said hole, said shutter being free of direct connection to the switch, and means on the operating member and the shutter to enforce a closed position of the shutter in all closed positions of the switch.

GEORGE B. WADSWORTH.